M. F. DEAN.
VENTILATING KNOB FOR COOKING VESSELS.
APPLICATION FILED APR. 18, 1921.
1,422,935.  Patented July 18, 1922.
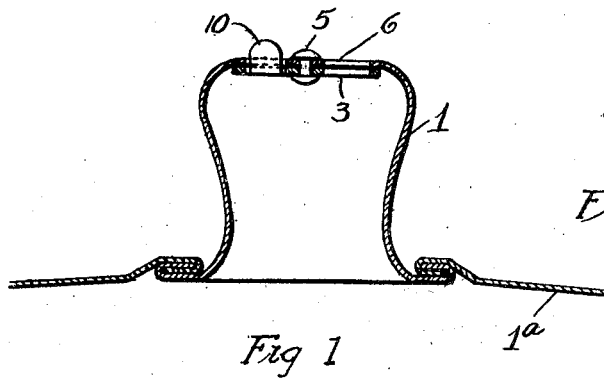
Fig 1
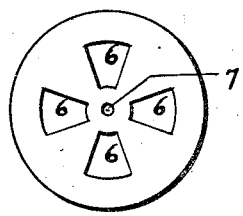
Fig 2
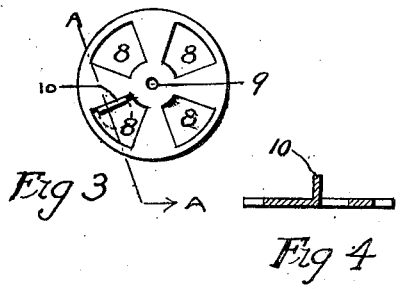
Fig 3
Fig 4
Witnesses
Laurence Ewald
George F. Beck
Murray F. Dean
INVENTOR

UNITED STATES PATENT OFFICE.

MURRAY F. DEAN, OF ST. LOUIS, MISSOURI.

VENTILATING KNOB FOR COOKING VESSELS.

1,422,935.　　　　Specification of Letters Patent.　　Patented July 18, 1922.

Application filed April 18, 1921. Serial No. 462,440.

*To all whom it may concern:*

Be it known that I, MURRAY F. DEAN, a citizen of the United States, residing in the city of St. Louis and State of Missouri, have invented a new and useful Improvement in Ventilating Knobs for Cooking Vessels, of which the following is a specification.

The invention relates to ventilating knobs for lids or covers for cooking vessels and has for its principal object to provide means for condensing steam and returning it to the meat or other article of food being cooked and to permit the escape of steam from the interior of the vessel when desired. The invention consists principally in a hollow knob for the cover of such vessels that will condense steam collected therein and drop it down onto the meat or other article of food in the vessel and that is also provided with ports that may be opened to permit the escape of steam from the vessel when desired. The invention consists further in the knob and in the parts and combinations of parts hereinafter described and claimed. In the drawing, which forms part of this specification, and wherein like reference numerals indicate like parts wherever they occur, Fig. 1 is a vertical section of a ventilating knob embodying my invention;

Fig. 2 is a plan view of the top of said knob;

Fig. 3 is a plan view of the movable disk forming a part thereof;

Fig. 4 is a horizontal sectional view of the disk showing a flange turned up; and Fig. 5 is a view of the rivet that secures the disk to the knob.

A knob 1 comprising a hollow shell of metal entirely open at the base is secured at the base to a cover 1ª for a cooking vessel, the interior of the knob communicating with the hole in the center of the cover. The top portion of the knob 1 is preferably flat and provided with a plurality of ports or perforations 6 (Fig. 2). Rotatably attached by a rivet 5, to the underside of the top portion of the knob 1 is a perforated disk 3, the knob being provided with a hole 7 through which the rivet passes.

The disk 3 has a plurality of ports or perforations 8 that correspond to the perforations 6 of the knob 1 and a perforation 9 that accommodates the rivet 5. The disk 3 is provided at the edge of one of the perforations 8 with a flange 10 that constitutes a handle by which said disk may be rotated. When the disk 3 is turned so that the perforations 8 thereof are in alinement with the corresponding perforations 6 of the knob 1, ports or openings are provided whereby steam may escape from the interior of the vessel; and when the disk is turned so that the perforations are not in alinement, said ports are closed, thus preventing the escape of steam. The flange 10 projects upwardly through one of the perforations 6 of the knob, and serves to limit the movement of the disk 3. When the flange 10 is in contact with one side wall of the perforation 6, the ports are completely opened; and when said flange is in contact with the other wall, the ports are completely closed.

When the ports are closed, steam collects in the hollow knob and condenses, dropping down on the meat in the vessel. Thus the knob assists in basting the meat being cooked. When it is desired to brown the food being cooked, the ports are opened and the steam escapes, permitting the food to brown quickly.

What I claim is:

1. A ventilating knob for cooking vessels comprising a hollow shell adapted to be secured to the cover of the vessel, said shell having a plurality of perforations therein, and a disk rotatably secured to said shell, said disk having perforations therein corresponding to the perforations of said shell, whereby said disk may be turned so that the corresponding perforations of the disk and shell are in alinement, thus providing openings into the vessel or so that the perforations are out of alinement, providing a closed cover for the vessel.

2. In combination with a cover for a cooking vessel having a central opening, a hollow knob secured to the cover over said opening, said hollow knob having a flat portion having a plurality of perforations and a disk secured to said flat portion and having perforations corresponding to the perforations of said flat portion of the knob.

3. In combination with a cover for a cooking vessel having a central opening, a hollow knob secured to the cover over said opening, said hollow knob having a flat portion having a plurality of perforations, and a disk secured to the underside of said flat portion and having perforations corresponding to the perforations of said flat portion of the knob, said disk having an upstanding flange disposed at the side margin of a solid portion of the disk and projecting upward through a perforation of the knob whereby the disk may be turned, the flange serving to limit the movement of the disk.

MURRAY F. DEAN.